3,280,145
NEW INDOLE DERIVATIVES AND THEIR
ACID ADDITION SALTS
Albert Hofmann and Franz Troxler, both of Bottmingen,
Switzerland, assignors to Sandoz Ltd., Basel, Switzerland
No Drawing. Filed June 1, 1964, Ser. No. 371,759
Claims priority, application Switzerland, June 4, 1963,
6,926/63; Feb. 18, 1964, 1,927/64
7 Claims. (Cl. 260—326.15)

The present invention relates to new indole derivatives and a process for the production thereof.

The present invention provides indole derivatives of Formula I,

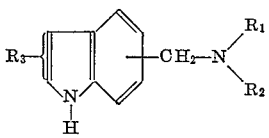

in which
$R_1$ is hydrogen, methyl, lower alkenyl or lower alkynyl,
$R_2$ is lower alkenyl or lower alkynyl, and
$R_3$ is hydrogen or methyl, with the proviso that when $R_1$ is either lower alkenyl or lower alkylnyl, $R_1$ and $R_2$ must be identical, and their non-toxic, pharmaceutically acceptable acid addition salts. The term "lower" as used herein designates alkenyl and alkynyl radicals with from 2 to 4 carbon atoms inclusive. As will be seen from Formula I, the basic side chain may be located in the 4-, 5-, 6- or 7-position of the indole nucleus, whereas the radical $R_3$—when this is a methyl radical—may be located in the 2- or 3-position.

The production of compounds I and their acid addition salts, comprises treating in an inert organic solvent an aminomethyl indole of Formula II,

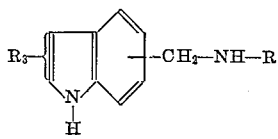

in which
R is hydrogen or methyl, and
$R_3$ has the above significance, with an alkenylating or alkynylating agent, and, when it is desired to produce an acid addition salt, salifying with an organic or inorganic acid. Examples of acids for salifying are hydrocholric, hydrobromic, sulphuric, citric, tartaric, succinic, maleic, malic, acetic, benzoic, hexahydrobenzoic, methanesulphonic, fumaric, gallic, and hydriodic acid.

Two methods of carrying out the process are as follows:

(1) When it is desired to produce compounds I, in which $R_1$ is methyl, it is advantageous to react an aminomethyl indole of Formula II, in which $R=CH_3$, in an inert organic solvent, e.g. ether, tetrahydrofuran, dioxane, chloroform, methylene chloride or ethanol, at room temperature with the appropriate alkenylating or alkynylating agent, e.g. an alkenyl ($C_2$–$C_4$) or alkynyl ($C_2$–$C_4$) halide; in order to take up the hydrogen halide liberated during the reaction, it is advantageous to use an excess amount over that theoretically required of methylaminomethyl indole, i.e. a smaller molar amount of alkenylating or alkynylating agent than of methylaminomethyl indole.

(2) When it is desired to produce compounds I, in which $R_1$ is hydrogen or alkenyl ($C_2$–$C_4$) or alkynyl ($C_2$–$C_4$), it is advantageous to react an aminomethyl indole of Formula II, in which R=H, in manner similar to that of method (1) above with approximately ½ mol of alkenyl ($C_2$–$C_4$) or alkynyl ($C_2$–$C_4$) halide. The resulting mixture of mono and dialkenyl or mono and dialkynyl compound may be separated into its components by adsorption chromatography.

Starting materials II may be produced, for example, from a cyano indole of Formula III,

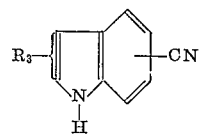

in which $R_3$ has the above significance, by reducing this to the corresponding aminomethyl indole. Reduction may be effected, for example, with catalytically activated hydrogen at room temperature and normal pressure; suitable catalysts are metals of the 8th group of the periodic system, e.g. palladium or platinum, or preferably nickel. The cyano indole may likewise be reduced with a complex hydride of an alkali metal, preferably lithium aluminium hydride. For purposes of isolating the reduction product, the catalyst is filtered off and the filtrate is evaporated to dryness and/or the alkali metal hydride complex and excess reducing agent are decomposed by the addition of an aliphatic alcohol with up to 4 carbon atoms in the molecule and water, any hydroxide precipitate which may be present in filtered off, the filtrate is shaken out between tartaric acid solution and ether and the base is liberated from the acid solution in manner known per se. For starting materials II, in which R is methyl, the introduction of this group in the aminomethyl indole has to be effected, e.g. by converting it with a chlorocarbonic acid ester to the corresponding urethane and subsequently reducing, e.g. with lithium aluminium hydride.

The cyano indoles having no additional substitutent in the indole nucleus (Formula III, $R_3=H$) have been described in the literature on the subject. Cyano indoles having a methyl group in the 3-position may be produced in that an acetoacetic acid ester x-halogeno-phenylhydrazone (x indicates the position of substitution of the halogen atom in the phenyl nucleus) is cyclized according to Fischer, e.g. with polyphosphoric acid, the resulting x-halogeno-3-methyl-indole-(2)-carboxylic acid ester is saponified to the corresponding carboxylic acid and this is decarboxylated by heating in quinoline with copper-I-cyanide and the halogen atom is simultaneously exchanged for the cyano radical. The production of cyano indoles having a methyl group in the 2-position may be effected, for example, in that an x-halogeno-2-nitro-toluene (x indicates the position of substitution of the halogenatom in the phenyl nucleus) is oxidized to the corresponding x-halogeno-2-nitrobenzaldehyde, this is condensed with nitroethane to the corresponding dinitrostyrene and this is subjected to reductive cyclization to give the indole.

At room temperature compounds I are relatively stable, colourless substances, most of which are crystalline; they are difficultly soluble in water but readily soluble in organic and inorganic acids. With acids most of them form crystalline salts which are relatively stable at room temperature. They give characteristic colour reactions with Keller's reagent (glacial acetic acid which contains ferric chloride and concentrated sulphuric acid) and with Van Urk's reagent (p-dimethylamino-benzaldehyde and dilute sulphuric acid).

The compounds of the invention are capable of inhibiting various pharmacodynamic effects of reserpine, e.g. its convulsion-promoting and central depressive action, and have an inhibiting effect towards the enzyme monoamine oxidase. When comparing the exemplified compounds of the invention as regards these two properties with other compounds having similar effects, the compounds of the invention show a much more selective reserpine antagonistic effect. Furthermore, they have certain sympathicomimetic properties. The toxicity of the exemplified compounds is low in comparison to their effectiveness. These properties are useful, for example, in the treatment of psychic illnesses, particularly depressive conditions, and also hypertonia. The compounds are preferably used in the form of their non-toxic, water-soluble acid addition salts.

The compounds of the invention may be used as pharmaceuticals as such or in the form of appropriate medicinal preparations for enteral or parenteral administration. In order to produce such medicinal preparations, the compounds of the invention are worked up with inorganic or organic adjuvants which are inert and physiologically acceptable. Examples of such adjuvants are as follows.

Tablets and dragées: lactose, starch, talc and stearic acid;
Injectable solutions: water, alcohols, glycerin and vegetable oils.

The pharmaceutical preparations may contain one or more suitable preserving, stabilizing or wetting agents, solubilizers, sweetening and colouring substances or flavourings.

The present invention further provides pharmaceutical compositions containing, in addition to a physiologically acceptable carrier, a compound I or an acid addition salt thereof.

As suitable daily dosage for the compound 6-(N-methyl-N-propargylamino-methyl)-indole has, for example, been found to be about 10 mg. to about 100 mg.

*Example 1.—6-(N-propargylamino-methyl)-indole*
*6-(N,N-dipropargylamino-methyl)-indole*

A solution of 15 g. of 6-cyano-indole in 270 ml. of absolute tetrahydrofuran is heated and kept at boiling temperature for 30 minutes whilst stirring together with 12 g. of lithium aluminium hydride. The complex and excess reducing agent are decomposed by the dropwise addition of methanol. After the addition of saturated sodium sulphate solution, filtration is effected and the filtrate is shaken out between tartaric acid solution and ether. The tartaric acid phase is made alkaline with sodium hydroxide solution, shaken out with chloroform and the chloroform solution is evaporated to dryness. The resulting 6-(amino-methyl)-indole crystallizes from chloroform in the form of triangular plates having a melting point of 134–135°. Keller's colour reaction: lilac; Van Urk's colour reaction: dark red.

2.5 g. of propargyl bromide are added dropwise whilst stirring to a solution of 5.84 g. of 6-(amino-methyl)-indole in 35 ml. of tetrahydrofuran and 5 ml. of methanol. After 1½ hours the reaction mixture is reduced in volume by evaporation, dissolved once more in ethyl acetate and shaken out three times with water. The ethyl acetate solution is dried and evaporated. The evaporation residue is chromatographed on 80 parts of silica gel with chloroform. 6-(N,N-dipropargylamino-methyl)-indole is eluted with chloroform containing 0.5% of ethanol; rodlets having a melting point of 87–88° from ether/petroleum ether. Keller's colour reaction: pink; Van Urk's colour reaction: carmine-red. Elution with chloroform containing 2% of ethanol yields 6-(N-propargylamino-methyl)-indole which crystallizes from ether/petroleum ether in the form of rodlets having a melting point of 96–98°. Keller's colour reaction: red; Van Urk's colour reaction: carmine-red.

*Example 2.—6-(N-methyl-N-propargylamino-methyl)-indole*

A solution of 15 g. of 6-cyano-indole in 270 ml. of absolute tetrahydrofuran is heated and kept at boiling temperature for 30 minutes whilst stirring together with 12 g. of lithium aluminium hydride. The complex and excess reducing agent are decomposed by the dropwise addition of methanol. After the addition of saturated sodium sulphate solution, filtration is effected and the filtrate is shaken out between tartaric acid solution and ether. The tartaric acid phase is made alkaline with sodium hydroxide solution, shaken out with chloroform and the chloroform solution is evaporated to dryness. The resulting 6-(amino-methyl)-indole crystallizes from chloroform in the form of triangular plates having a melting point of 134–135°. Keller's colour reaction: lilac; Van Urk's colour reaction: dark red.

14.7 g. of 6-(amino-methyl)-indole are dissolved in 100 ml. of tetrahydrofuran and 440 ml. of chloroform and the solution is covered with a layer of 204 ml. of water. 20.2 ml. of chloroformic acid ethyl ester are added at 0° whilst stirring vigorously and then a solution of 8.2 g. of sodium hydroxide in 175 ml. of water is added dropwise thereto. After 30 minutes shaking out between chloroform/hydrochloric acid and chloroform/water is effected. Evaporation of the dried chloroform solution yields 6-(N-ethoxycarbonylamino-methyl)-indole which crystallizes from chloroform in the form of polyhedrons having a melting point of 84–85°.

22.3 g. of 6-(N-ethoxycarbonylamino-methyl)-indole in 630 ml. of absolute tetrahydrofuran are heated to the boil at reflux for one hour together with 20.1 g. of lithium aluminium hydride and the reduction product is worked up in the manner described in the first paragraph. From chloroform quadrangular plates having a melting point of 120–121°. Keller's colour reaction: brown red; Van Urk's colour reaction: red.

4.3 g. of the so obtained 6-(N-methylamino-methyl)-indole are dissolved in 30 ml. of methylene chloride and 5 ml. of methanol and 1.62 g. of propargyl bromide are added thereto whilst stirring. After 1½ hours the reaction mixture is shaken out three times with water, the methylene chloride solution is dried and evaporated to dryness. The residue is chromatographed with chloroform on 50 parts of silica gel, whereupon 6-(N-methyl-N-propargylamino-methyl)-indole is washed from the column with chloroform containing 1% of ethanol. From ether/petroleum ether: flat rodlets having a melting point of 74–76°. Keller's colour reaction: brownish pink; Van Urk's colour reaction: carmine-red.

*Example 3.—6-(N-methyl-N-allylamino-methyl)-indole*

4.3 g. of 6-(N-methylamino-methyl)-indole, produced in a manner analogous to that described in the preceding example, are dissolved in 30 ml. of methylene chloride and 5 ml. of methanol and 1.66 g. of allyl bromide are added thereto. Working up is effected in a manner analogous to that described in the preceding example. The crude 6-(N-methyl-N-allylamino-methyl)-indole is chromatographed with chloroform on 50 parts of silica gel, whereupon it is eluted with chloroform containing 2% of ethanol. From ether/petroleum ether rodlets having a melting point of 78–80°. Keller's colour reaction: brownish pink; Van Urk's colour reaction: red.

*Example 4.—4-(N-methyl-N-propargylamino-methyl)-indole*

10.6 g. of 4-cyano-indole in 200 ml. of absolute tetrahydrofuran are stirred for 30 minutes at boiling temperature together with 8.5 g. of lithium aluminium hydride. The complex and excess reducing agent are decomposed by the dropwise addition of methanol. After the addition of saturated sodium sulphate solution, filtration is effected and the filtrate is shaken out between tartaric acid solution and ether. The tartaric acid phase is made alkaline with sodium hydroxide solution, shaken out with chloroform and the chloroform solution is evaporated to dryness. The resulting 4-(amino-methyl)-indole crystallizes from chloroform in the form of irregular prisms having a melting point of 132–134°. Keller's colour reaction: red brown; Van Urk's colour reaction: lilac.

9.54 g. of 4-(amino-methyl)-indole are dissolved in 250 ml. of chloroform whilst adding 10 ml. of methanol and covered with a layer of 130 ml. of water. 13.5 ml. of chloroformic acid ethyl ester are added at 0° whilst stirring vigorously and then a solution of 5.75 g. of sodium hydroxide in 130 ml. of water is added dropwise at 0° also. After 30 minutes shaking out between chloroform/hydrochloric acid and chloroform/water is effected. Evaporation of the dried chloroform solution yields 4-(N-ethoxycarbonylamino-methyl)-indole which may be further worked up as such without characterization.

13.7 g. of 4-(N-ethoxycarbonylamino-methyl)-indole in 270 ml. of absolute tetrahydrofuran are heated to the boil at reflux for 2 hours together with 15.6 g. of lithium aluminium hydride and the reduction product is worked up in the manner described in the first paragraph. From chloroform/petroleum ether prisms having a melting point of 90–92°. Keller's colour reaction: yellowish; Van Urk's colour reaction: violet tinged light red.

4.5 g. of 4-(N-methylamino-methyl)-indole are dissolved in 35 ml. of methylene chloride and 1.71 g. of propargyl bromide are added thereto whilst stirring. After 1½ hours the reaction mixture is shaken out three times with water, the methylene chloride solution is dried and evaporated to dryness. The evaporation residue is chromatographed with chloroform on 50 parts of silica gel, whereupon 4-(N-methyl-N-propargylamino-methyl)-indole is washed from the column with chloroform containing 1% of ethanol. From ether/petroleum ether fine needles having a melting point of 60–63°. Keller's colour reaction: light yellow; Van Urk's colour reaction: lilac.

*Example 5.—2-methyl-6-(N-methyl-N-propargylamino-methyl)-indole*

8.2 g. of 2-methyl-6-(aminomethyl)-indole are dissolved in 220 cc. of chloroform and 104 cc. of water are poured thereover. 10.3 cc. of chloroformic acid ethyl ester are added at 0° whilst stirring vigorously and subsequently a solution of 4.2 g. of sodium hydroxide in 90 cc. of water are added dropwise also at 0°. After ½ hour the mixture is shaken out between chloroform/hydrochloric acid and chloroform/water. Upon evaporation of the dried chloroform solution 2-methyl-6-(N-ethoxy-carbonylamino-methyl)-indole result, which crystallises from chloroform/petroleum ether in boatlike plates having a melting point of 89–91°.

11.5 g. of 2-methyl-6-(N-ethoxy-carbonylamino-methyl)-indole are heated to the boil at reflux for 45 minutes in 350 cc. of abs. tetrahydrofuran together with 9.4 g. of lithium aluminium hydride. Methanol is added dropwise so as to decompose the complex and excess lithium aluminium hydride. After the addition of a saturated sodium sulphate solution the mixture is filtered and the filtrate shaken between a tartaric acid solution and ether. The tartaric acid phase, which has been made alkaline by the addition of sodium hydroxide, is shaken out with chloroform, the chloroform extracts are dried and the chloroform is evaporated. The resulting 2-methyl-6-(N-methylamino-methyl)-indole crystallises from chloroform/petroleum ether in the form of rodlets having a melting point of 133–135°. Keller's colour reaction: faint yellow, Van Urk's colour reaction: red.

7.4 g. of 2-methyl-6-(N-methylamino-methyl)-indole are dissolved in 50 cc. of methylene chloride, 3.5 cc. of methanol and 13.5 cc. of triethylamine and 3.65 g. of propargyl bromide are added thereto whilst stirring at room temperature. After 1 hour the reaction mixture is shaken out 3 times with water, the methylene chloride solution dried and evaporated to dryness. The residue is chromatographed with chloroform on 30 parts of silica gel. The 2-methyl-6-(N-methyl-N-propargylamino-methyl)-indole is washed from the column with chloroform+1% ethanol. Rodlets having a melting point of 80–82° result from ether/petroleum ether. Keller's colour reaction: faint yellow, Van Urk's colour recation: red.

The 2-methyl-6-(aminomethyl)-indole, used as a starting material, is obtained as follows: 2-nitro-4-bromo-benzaldehyde is condensed in ethanol in the presence of potassium hydroxide with nitro-ethane to form the corresponding nitro-alcohol from which the 4-bromo-2,2'-dinitro-2'-methyl-styrol is obtained with sodium acetate in acetic acid anhydride. Rhombohedrons having a melting point of 145–146° result from ethanol/water. By cyclisation of 4-bromo-2,2'-dinitro-2'-methyl-styrol in ethanol/glacial acetic acid with iron powder, the 2-methyl-6-bromo-indole results which crystallises from ligroin in the form of prisms having a melting point of 130–131°. 2-methyl-6-bromo-indole is converted to 2-methyl-6-cyano-indole by heating with cuprous cyanide in chinolin; uneven prisms having a melting point of 84–85° result from ethyl acetate/petroleum ether. Keller's colour reaction: faint yellow, Van Urk's colour reaction: rosy red.

Finally, be reduction of 2-methyl-6-cyano-indole with lithium aluminium hydride in abs. tetrahydrofuran, 2-methyl-6-(aminomethyl)-indole results and upon crystallising from chloroform/petroleum ether yields druses having a melting point of 107–108°. Keller's colour reaction: faint yellow, Van Urk's colour reaction: red.

We claim.

1. A compound selected from the group consisting of an indole derivative of the formula:

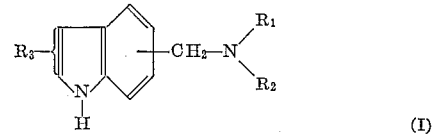

(I)

$R_1$ is selected from the group consisting of hydrogen, methyl, lower alkenyl and lower alkynyl, $R_2$ is selected from the group consisting of lower alkenyl and lower alkynyl, with the proviso that when $R_1$ is lower alkenyl or lower alkynyl $R_1$ and $R_2$ must be identical, and $R_3$ is selected from the group consisting of hydrogen and methyl, and its non-toxic, pharmaceutically acceptable acid addition salts.

2. 6-(N-propargylamino-methyl)-indole.
3. 6-(N,N-dipropargylamino-methyl-indole.
4. 6-(N-methyl-N-propargylamino-methyl)-indole.
5. 6-(N-methyl-N-allylamino-methyl)-indole.
6. 4-(N-methyl-N-propargylamino-methyl)-indole.
7. 2 - methyl-6-(N-methyl-N-propargylamino-methyl)-indole.

References Cited by the Examiner

UNITED STATES PATENTS 2,703,325  3/1955  Speeter _____ 260—319

OTHER REFERENCES

Wagner et al.: Synthetic Organic Chemistry, New York, John Wiley & Sons, Inc., 1953, pp. 666–667.

ALEX MAZEL, *Primary Examiner.*

HENRY R. JILES, MARY U. O'BRIEN,
*Assistant Examiners.*